April 27, 1943.  V. G. VAUGHAN  2,317,830
THERMOSTAT AND METHOD OF MANUFACTURING THE SAME
Filed April 30, 1936  2 Sheets-Sheet 1

Victor G. Vaughan,
Inventor,
Delos G. Haynes,
Attorney.

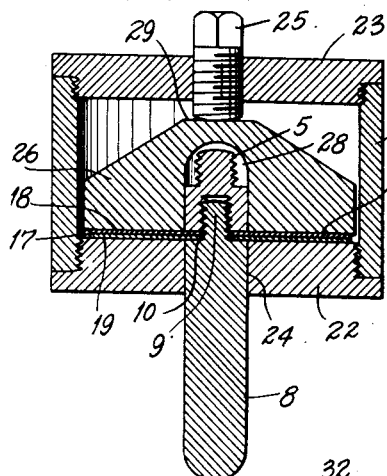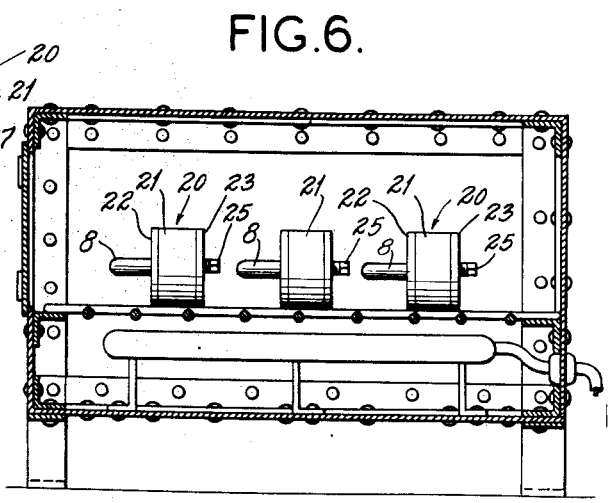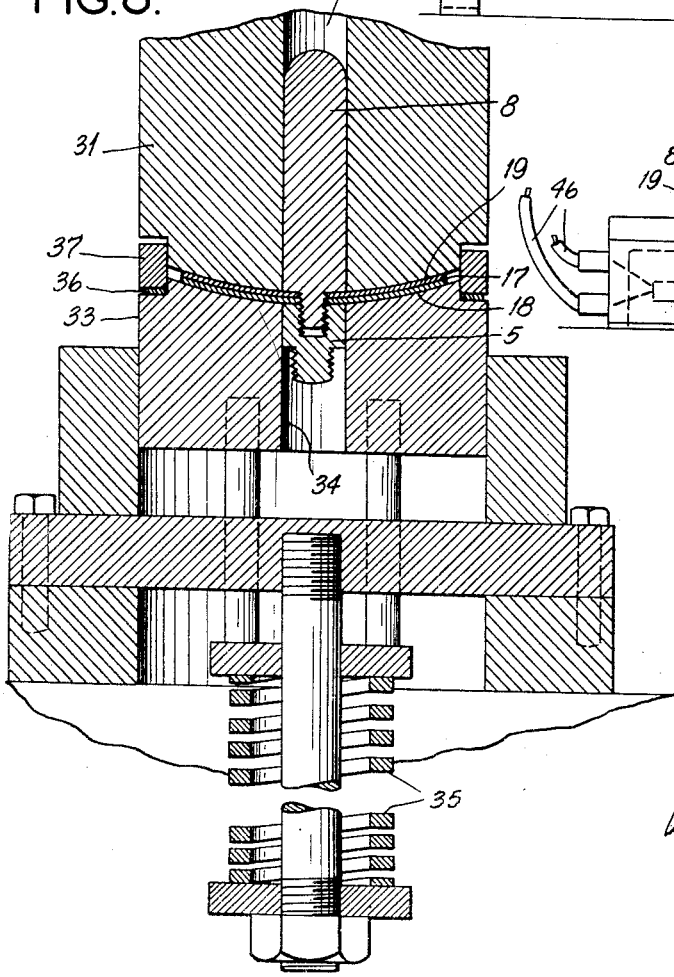

Patented Apr. 27, 1943

2,317,830

UNITED STATES PATENT OFFICE 2,317,830

THERMOSTAT AND METHOD OF MANUFACTURING THE SAME

Victor G. Vaughan, Attleboro, Mass., assignor, by mesne assignments, to Metals & Controls Corporation, Attleboro, Mass., a corporation of Massachusetts Application April 30, 1936, Serial No. 77,097

3 Claims. (Cl. 297—15)

This invention relates to thermostats, and with regard to certain more specific features, to snap-acting thermostats, and methods of manufacturing the same.

Among the several objects of the invention may be noted the provision of a snap-acting thermostat which is provided with improved means for conducting heat thereto; the provision of a thermostat of the class described which is reliable in operation and subject to accurate calibration; the provision of a thermostat of the class described which is relatively simple in construction; and an economical method by which to manufacture such a thermostat. Other objects will be in part obvious and in part pointed out hereinafter.

The invention accordingly comprises the elements and combinations of elements, steps and sequence of steps, features of construction, and arrangements of parts which will be exemplified in the structures and methods hereinafter described, and the scope of the application of which will be indicated in the following claims.

In the accompanying drawings, in which are illustrated several of various possible embodiments of the invention:

Fig. 5 is a sectional view of a clamp, showing a thermostatic device therein;

Fig. 6 is a diagrammatic section of an oven, with the clamp of Fig. 5 therein;

Fig. 7 is a diagrammatic elevation of a heater; and,

Fig. 8 is a diagrammatic sectional elevation of a press and die, showing a thermostatic element therein.

Similar reference characters indicate corresponding parts throughout the several views of the drawings.

The present invention is concerned principally with thermostatic elements of the type illustrated in John A. Spencer Patent No. 1,448,240, dated March 13, 1923. It likewise applies to other composite metallic thermostats operating on the principle of differential expansion of layers of a composite metal, as will be apparent hereinafter, but for purposes of description, this specification will be confined to a thermostatic element made in accordance with said patent.

It is a fact, particularly with dished composite metallic discs such as shown in said patent, that the conduction of heat from the surroundings to the disc is a difficult problem. In other words, the problem is to secure the thermal equilibrium between the temperature of the disc itself and the ambient temperature it is desired to control. This is particularly true where the ambient temperature is occasioned by a particular heating coil provided for that purpose, as in the case of thermal relays and the like.

It is a primary purpose of the present invention to provide a new means of conducting heat into the thermostatic disc, so that the temperature of the disc is much more quickly brought into equilibrium with the ambient temperature (such as the temperature of the coil, for example).

Figure 1:
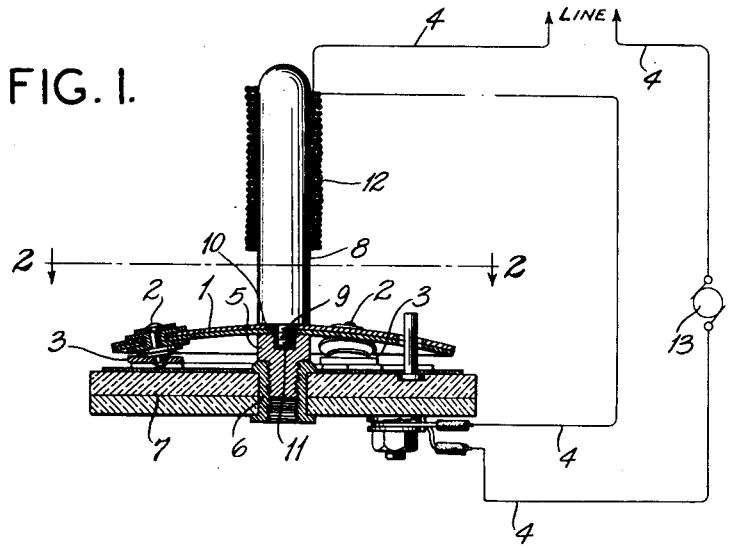
Fig. 1 is a vertical section, partly diagrammatic, of a current protective device embodying a thermostat made in accordance with the present invention.
Figure 2:
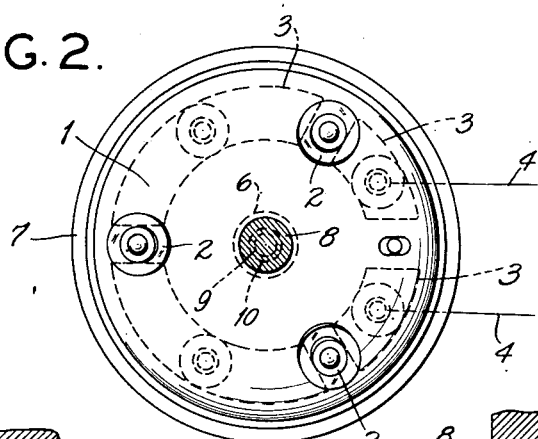
Fig. 2 is a horizontal section taken substantially along line 2—2 of Fig. 1.

Referring now more particularly to Fig. 1, numeral 1 indicates a bimetallic dished disc made in accordance with said Patent No. 1,448,240. This disc will snap from the curvature shown to a reverse curvature upon change of temperature between predetermined limits, this reversal of curvature making and breaking the connections between terminal engaging elements 2 on disc 1 and line terminals 3 of a circuit 4. The construction of the terminal engaging elements 2 and line terminals 3 is of no particular moment to the present invention, and is elsewhere described (see, for example, John A. Spencer Patent 1,718,716, dated June 25, 1929). The disc 1 is supported on a plug 5 which is threaded into a bushing 6 carried by a base 7. The disc 1 is secured to the plug 5 by means of a projecting element 8, which has a threaded end 9 extending through a hole 10 in the center of the disc 1 and engaging threaded recess 11 in the plug 5. The disc 1 is thus centrally clamped between the element 8 and the plug 5.

The element 8 is provided as the means for conducting heat into the disc 1. In the embodiment of Fig. 1, there is shown, for purpose of illustration, a current coil 12 which is wrapped around the element 8. The current coil 12 is in the circuit 4, in series with the electrical switching elements 2 and 3, and in series, for example, with a motor 13, or it may be in a separate circuit cooperating with circuit 4.

A particular feature of the present invention is found in the following: If the disc 1 were merely clamped loosely between the elements 8 and plug 5, there would be offered an imperfect heat conduction path from the element 8 into the disc 1. On the other hand, if the disc 1 is tightly clamped between the element 8 and the plug 5, the clamping action would place strains within the disc that would impair seriously its thermally responsive action, to such an extent that it would no longer respond at the temperature for which it was originally constructed, and, furthermore, while it would respond to certain unpredictable temperatures by snapping, such temperatures would not be uniform, and the snapping might occur at one temperature at one time and at another temperature at another time.

According to the present invention, the element 8 and the plug 5 are tightly clamped onto the disc 1, in order to present a good heat conduction path, but these elements are positioned on the disc prior to its formation or heat treatment, and after the element 8 and the plug 5 are in position, the disc is formed and heat treated, whereby its response characteristics are brought to the desired values and made uniform.

More specifically, the thermostat of the present invention may be made in the following manner:

A circular, flat disc 17 (see Fig. 5) is initially stamped from a sheet of thermostatic material. Such thermostatic material ordinarily comprises bimetal, but it is to be understood that more than two layers of metal may be present. The central opening 10 is preferably stamped in the disc 17 by the same operation. Then, while the disc is flat, the elements 5 and 8 are securely clamped in position on the disc 17, the threaded projection 9 of the element 8 extending through the hole 10.

While in the embodiment shown, the layer of bimetal 18 on the side of the element 5 preferably has a larger temperature coefficient of expansion than the layer 19 on the side of the element 8, it is understood that layers 18 and 19 may be reversed, which means can be used to reverse the operation of the thermostat if desired.

Numeral 20 indicates a clamping device, which comprises a cylinder 21 having a bottom 22 and a top 23 removably screwed therein. The bottom 22 has a central opening 24 adapted to pass the element 8 of the thermostat. The top 23 has a stud 25 threaded therein, the head of the stud being outside of the clamp. Inside the clamp there is provided a follower 26 having a flat lower face 27 in which is provided a recess 28 for receiving the stud 5 on the disc. The inner end of the stud 25 bears against the top face 29 of the follower 26.

The flat disc 17 is tightly clamped between the upper face of the bottom 22 of the clamp and the lower flat face 27 of the follower 26, by driving down the stud 25 against the follower 26.

With the thermostat thus tightly held in the clamp, the clamp is put into an oven (Fig. 6) or otherwise heated for a suitable length of time and at a suitable temperature. If the components of the thermostatic metal are Monel and Invar, for example, the temperature is preferably of the magnitude of 400° C. and the time of treatment is of the magnitude of one hour. The time and temperature of treatment vary considerably, depending upon factors such as the working temperature range that is expected of the device after it is finished. With a higher temperature (provided the temperature is not excessive for the type of material used) a shorter time is required, and with a lower temperature a longer time.

After this heat treatment is completed, and the thermostat is released from the clamp, the disc 17 will be found to be slightly concave on the side of the metal having the higher thermal coefficient of expansion, that is, after the disc has cooled to room temperature. This means that a deformation has occurred, because prior to the treatment the disc 17, as explained, was substantially flat at room temperatures. The time and temperature of treatment should probably be sufficient to cause the disc 17 to have a definite concavity on the side of the higher thermal coefficient of expansion. The temperature should not, however, be high enough to change the quality of other characteristics of the disc.

After the disc has been put through this heat treatment, which may be referred to for convenience as the first step, it is formed, or shaped, in a press such as the one illustrated in Fig. 8. In this press, an upper male die 31 is provided, said die having a central opening 32 to accommodate the element 8. This upper die 31 is forced down upon a lower female die 33, which has a similar central opening 34 for the accommodation of the stud or element 5. The lower die 33 is cushioned upon a spring 35. The disc 17, which is inserted between the two dies, is thereby given a contour of the general type shown in Fig. 1. A washer 36 may be inserted beneath a ring 37 to limit the movement of the upper die 31 towards the lower die 33 to the desired extent, and thereby to control the contour of the completed disc.

During the forming or shaping operation, the discs are preferably at a temperature above the temperature at which they are to be used. Discs for use at high temperatures as about 300° C. are preferably formed at a temperature of 50° to 100° C. above that figure. This temperature may vary considerably, depending upon the normal working range of the temperature of the finished disc. In order to heat the discs that are ready for the forming operation, such discs may be placed upon a hot plate such as the plate illustrated at numeral 38 in Fig. 7, wherein a heater unit 39 is supplied with current from suitable terminals 40. Suitable depressions 41 in the plate 38 accommodate the element 5 attached to the disc.

After the disc has been formed or shaped, it is preferably heated on a hot plate of the type shown in Fig. 7, or in an oven, to improve it. This treatment is preferably made while the disc is in the hot position, that is, concave on the side having the lower thermal coefficient of expansion. This is the position that the disc, when completed, normally takes when heated to and above the point at which it responds in a temperature rise.

Ordinarily the disc is forced to the hot position for the purpose of this heat treatment. This saves time and makes it unnecessary to use a temperature that might be detrimental to the device.

Thermostatic material intended for use at around 300° C. with a normal working range of say 200 to 300° C. is subjected to a temperature of around 350 to 400° C. in this step of the treatment, thus subjecting the material to shape-changing stresses greater than those encountered during normal operation. By shape-changing stresses is meant stresses tending to cause change of shape of the thermostatic material. The time of treatment may be ten minutes to a half hour or so. A higher temperature requires a shorter time, and a lower temperature a longer time. The temperature is preferably above the normal working range of the material.

The temperatures used in connection with the heat treatment of the present invention vary with the materials of which the thermostatic discs are composed. The temperatures need not be and preferably are not high enough to anneal the materials or otherwise to affect them deleteriously.

After the completion of the described heat-treatment of the thermostats, they will be found to have reliable heat response characteristics, by which is meant the temperatures at which the disc snaps from position to position are reproducible over a normal life of many years. Further, by controlling the extent of dishing of the disc in the shaping operation, the temperatures at which the disc responds by snapping can accurately be controlled. This is true even though the elements 5 and 8 are permanently and tightly clamped in position on the disc.

Any one or more of the heat-treating and forming steps described above are beneficial to the final thermostat, although it is preferred that the entire sequence be carried through on every disc.

Figure 3:
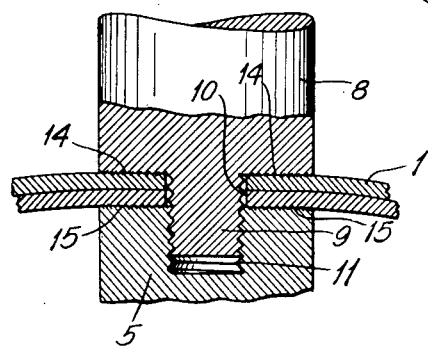
Figs. 3 and 4 are enlarged sections of optional construction for a portion of the thermostat of the present invention.

The heat conduction path through the element 8 into the disc 1 may be even more improved if the shoulder of the element 8 is welded to the face of the disc 1 as indicated by the cross-hatching at numeral 14 in Fig. 3. It is also advantageous that the welding be carried out, as indicated by numeral 15, between the disc 1 and the post 5.

Various methods of welding may be used to achieve the desired result. However, it has been found that spot welding or electrical resistance welding is ordinarily more satisfactory, as these methods have less tendency to destroy the bimetallic character of the disc, in the region immediately surrounding the weld. It will be understood that the welding should preferably be carried out in such a manner as not to impair the differential expansion characteristics which render the disc operative as a snap-acting thermostat.

Figure 4:
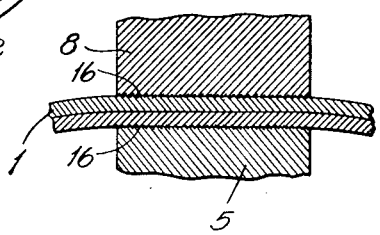

Fig. 4 shows an alternative method of welding, where the element 8 carries a plain lower surface 16 which is welded directly in facial contact with the disc 1. The same construction is adopted for the plug 5. In this manner, the hole 10 and the threaded portions 9 and 11 are dispensed with.

Ordinarily, it is advisable to carry out the described heat treatment of the disc after the elements 5 and 8 have been welded thereto, in the same manner as that described for merely clamping the elements 5 and 8 to the disc. However, under certain circumstances, the welding may be carried out in such a manner that the temperature response characteristics of the disc are not seriously affected, in which event a preformed, preliminarily heat treated disc 1 may be used. In this connection, it will be seen that the element 8 is welded to the disc 1 in a region of said disc which, in operation, undergoes substantially no movement or flexure in any event. For this reason, the welding procedure is sometimes without substantially harmful effect upon the operating characteristic of the disc.

The device illustrated in Fig. 1 is essentially a current protective device, functioning to break the circuit 4 when the current exceeds a predetermined value. This is because the heating effect of coil 12 is proportional to the square of the current flowing in the circuit 4. This heating is directly and immediately conducted to the thermostatic disc 1 through the element 8, the tightly clamped or welded joint affording an unbroken metallic conduction path which operates much more completely and immediately than is the case with any devices heretofore available. If the current exceeds a predetermined value, the heating effect of the coil 12 is sufficient to cause the disc 1 to snap to a position of reverse curvature, thereby breaking the circuit and protecting the motor 3 or whatever other device is operated by the circuit.

For simplicity, the term "rigidly affixed" will be used herein to indicate either the tight clamping or the welding operations by which the heat conducting elements are affixed to the disc.

In view of the above, it will be seen that the several objects of the invention are achieved and other advantageous results attained.

As many changes could be made in carrying out the above constructions and methods without departing from the scope of the invention, it is intended that all matter contained in the above description or shown in the accompanying drawings shall be interpreted as illustrative and not in a limiting sense.

I claim:

1. A thermostat comprising a dished disc of composite thermostatic metal, and an element welded to said disc in the dished region thereof.

2. The method of manufacturing snap-acting disc thermostatic devices which comprises cutting a piece of composite thermostatic material to form the disc, welding a metallic element to the central part of the disc, and thereafter dishing the disc and subjecting it to predetermined heating substantially greater than that encountered in normal operation.

3. The method of manufacturing snap-acting disc thermostats, which comprises cutting a disc-shaped thermostat from a composite thermostatic material, welding an element to the thermostat, securing the thermostat to restrain change of shape thereof, heating the thermostat while thus secured, dishing the thermostat to the desired curvature while heated, in such manner that the dished portion includes the region to which the element is welded, forcing the thermostat to the dished position it will normally assume when hot, and heating the thermostat while in said hot position.

VICTOR G. VAUGHAN.